(12) United States Patent
Huang et al.

(10) Patent No.: US 11,072,738 B2
(45) Date of Patent: Jul. 27, 2021

(54) ENVIRONMENT-FRIENDLY HIGH-TEMPERATURE RESISTANT WATER-BASED DRILLING FLUID PLUGGING ANTI-SLOUGHING AGENT, PREPARATION METHOD THEREOF AND THE WATER-BASED DRILLING FLUID

(71) Applicant: CHINA UNIVERSITY OF PETROLEUM (EAST CHINA), Shandong (CN)

(72) Inventors: Xianbin Huang, Qingdao Shandong (CN); Jinsheng Sun, Qingdao Shandong (CN); Kaihe Lv, Qingdao Shandong (CN); Jingping Liu, Qingdao Shandong (CN); Yingrui Bai, Qingdao Shandong (CN); Jintang Wang, Qingdao Shandong (CN); Jiafeng Jin, Qingdao Shandong (CN)

(73) Assignee: CHINA UNIVERSITY OF PETROLEUM (EAST CHINA), Shandong, CHINA, Qingdao (CN)

( * ) Notice: Subject to any disclaimer, the term of this patent is extended or adjusted under 35 U.S.C. 154(b) by 0 days.

(21) Appl. No.: 17/015,903

(22) Filed: Sep. 9, 2020

(65) Prior Publication Data
US 2021/0189216 A1 Jun. 24, 2021

(30) Foreign Application Priority Data
Dec. 20, 2019 (CN) .......................... 201911324934.X

(51) Int. Cl.
| | | |
|---|---|---|
| C09K 8/42 | (2006.01) | |
| C08F 257/00 | (2006.01) | |
| C09K 8/24 | (2006.01) | |
| C09K 8/44 | (2006.01) | |

(52) U.S. Cl.
CPC ............ *C09K 8/426* (2013.01); *C08F 257/00* (2013.01); *C09K 8/24* (2013.01); *C09K 8/44* (2013.01)

(58) Field of Classification Search
None
See application file for complete search history.

(56) References Cited

U.S. PATENT DOCUMENTS

| | | | | |
|---|---|---|---|---|
| 4,814,096 A | * | 3/1989 | Evani ................... | C10M 173/02 507/224 |
| 2004/0177957 A1 | * | 9/2004 | Kalfayan ............... | E21B 43/25 166/270 |
| 2006/0258756 A1 | * | 11/2006 | Adam ....................... | C08F 2/32 516/53 |
| 2011/0243873 A1 | * | 10/2011 | Hough ................ | C08F 283/065 424/70.16 |

FOREIGN PATENT DOCUMENTS

| | | |
|---|---|---|
| CN | 108728057 A | 11/2018 |
| CN | 110387016 A | 10/2019 |
| CN | 110845659 A | 2/2020 |

* cited by examiner

*Primary Examiner* — Jeffrey D Washville
(74) *Attorney, Agent, or Firm* — Calfee Halter & Griswold LLP

(57) ABSTRACT

The present disclosure provides a preparation method of an environment-friendly high-temperature resistant water-based drilling fluid plugging anti-sloughing agent, the preparation method comprises the following steps: mixing and emulsifying a styrene monomer, an acrylic monomer and an emulsifier MS-1 aqueous solution to prepare a pre-polymerization emulsion; dispersing hydrophilic monomer, cationic monomer and an emulsifier MS-1 in water, adjusting the pH to be within a range of 6.5-8.5, then adding mixed monomers of the styrene monomer and acrylic monomer to blend and emulsify to prepare a post-polymerization emulsion; adding a first cross-linking agent and a first initiator into the pre-polymerization emulsion, uniformly dispersing the mixture and carrying out reaction; subsequently dropwise adding the post-polymerization emulsion, adding a second cross-linking agent and a second initiator, uniformly dispersing the mixture and then continuously carrying out reaction, drying and crushing the reaction product to prepare the plugging anti-sloughing agent.

16 Claims, No Drawings

ENVIRONMENT-FRIENDLY HIGH-TEMPERATURE RESISTANT WATER-BASED DRILLING FLUID PLUGGING ANTI-SLOUGHING AGENT, PREPARATION METHOD THEREOF AND THE WATER-BASED DRILLING FLUID

PRIORITY CLAIM & CROSS REFERENCE

The application claims priority to Chinese Application No. 201911324934.X, filed on Dec. 20, 2019, entitled "Preparation Method of Environment-friendly High-temperature resistant Water-based Drilling Fluid Plugging Anti-sloughing Agent", which is herein specifically and entirely incorporated by reference.

FIELD

The present disclosure belongs to the field of oilfield chemistry in the petroleum industry, and particularly relates to an environment-friendly high-temperature resistant water-based drilling fluid plugging anti-sloughing agent, a preparation method thereof and a water-based drilling fluid.

BACKGROUND

The drilling fluid is called "blood" for well drilling, and the water-based drilling fluid is a complex colloid-suspension multistage dispersion system formed by clay particles and various chemical agents in water, it is an indispensable core engineering technology in oil-gas exploration and development, directly influences the safety and efficiency of well drilling, and is vital for ensuring the success of well drilling.

The sulfonated materials of the drilling fluid mainly comprise sulfonated asphalt, sulfonated lignite, sulfonated phenolic resin, sulfonated tannin, sulfonated tannin extract and the like, the sulfonated material has strong temperature resistance, and plays a very important role in the drilling process of deep wells, ultra-deep wells and high-temperature formations. Wherein the sulfonated asphalt is used as a plugging anti-sloughing material, it contains sulfonic groups and is apt to disperse in water, can generate a strong adsorption effect with a rock matrix, and can delay the hydration dispersion of shale particles to play an anti-sloughing effect when being adsorbed on a mud shale interface; meanwhile, the sulfonated asphalt can fill pore throats and cracks to play a plugging role, and may cover mud shale interfaces to prevent the drilling fluid from invading stratum. However, the sulfonated asphalt has high chrominance and poor environmental protection performance; in addition, the softening temperature window of the sulfonated asphalt material is narrow, that is, the sulfonated asphalt material is easy to change into a fluid state after the temperature exceeds the softening point, it loses strength and cannot effectively block a high-temperature stratum.

In order to comply with increasingly strict environmental protection regulations, some oil fields have put forward the requirement of desulfonation of a drilling fluid system in recent years, that is, the sulfonated materials are not used in the drilling fluid system. At present, the drilling operation of the deep-layer and ultra-deep-layer high-temperature wells is difficult in case of lacking the sulfonated materials, drilling accidents frequently occur, which are mainly the collapse of well walls, serious drilling fluid filtrate loss, sticking drill rig and the like. The conventional materials, including polymeric materials, cannot demonstrate the desirable properties of the sulfonated materials described above.

CN108728057A discloses a nanometer resin emulsion plugging agent for drilling fluid, the raw materials include acrylic acid, butyl acrylate, styrene and an emulsifier; the plugging agent provided by the invention can be used for plug small cracks in a well drilling process, and also can have certain pressure-bearing and collapse-prevention effects on a well wall, but the plugging performance is not good enough, and the plugging effect on the high temperature stratum is not mentioned.

For the sake of solving the aforementioned problems, it is necessary to research and develop a novel environment-friendly high-temperature plugging anti-sloughing agent to replace the sulfonated materials, so as to meet the requirements of engineering operation in the process of drilling deep wells, ultra-deep wells and high-temperature wells.

SUMMARY

The present disclosure intends to overcome the defects in the prior art and provides a preparation method of an environment-friendly high-temperature resistant water-based drilling fluid plugging anti-sloughing agent. The plugging anti-sloughing agent prepared with the method of the present disclosure has a core-shell structure, it is non-toxic and shows desirable environmental protection performance; the plugging anti-sloughing agent has excellent properties in regard to reducing filtrate loss as well as plugging and anti-sloughing, and has good temperature resistance, and can perform effective plugging and anti-sloughing in regard to the high-temperature stratum.

In a first aspect, the present disclosure provides a method for preparing an environment-friendly high-temperature resistant water-based drilling fluid plugging anti-sloughing agent, comprising:

(1) mixing a styrene monomer and an acrylic monomer to obtain a mixed monomer; then blending and emulsifying the mixed monomer and an emulsifier MS-1 in an aqueous solution to prepare a pre-polymerization emulsion;

(2) dispersing hydrophilic monomer, cationic monomer and the emulsifier MS-1 in water to obtain an emulsion, and adjusting pH to be within a range of 6.5-8.5 to obtain a dispersion liquid; then adding the mixed monomers consisting of a styrene monomer and an acrylic monomer, blending and emulsifying the mixture to prepare a post-polymerization emulsion;

(3) adding a first cross-linking agent and a first initiator sequentially into the pre-polymerization emulsion obtained in the step (1), uniformly dispersing, and carrying out reaction at the temperature of 60-90° C. for 0.5-2 h; then dropwise adding the post-polymerization emulsion obtained in the step (2), adding a second cross-linking agent and a second initiator sequentially, uniformly dispersing and then continuously carrying out reaction at the temperature of 60-90° C. for 2-5 hours, drying and crushing the reaction product to prepare the environment-friendly high-temperature resistant water-based drilling fluid plugging anti-sloughing agent; the first cross-linking agent is a mixture of a chemical cross-linking agent and a silane coupling agent, the chemical cross-linking agent is N,N-methylene bisacrylamide or water-soluble phenolic resin, and the silane coupling agent is KH550, KH560 or KH570; the second cross-linking agent is the same as the first crosslinking agent.

In a second aspect, the present disclosure provides an environment-friendly high-temperature resistant water-based drilling fluid plugging anti-sloughing agent prepared with the aforementioned method.

In a third aspect, the present disclosure provides a water-based drilling fluid, wherein the water-based drilling fluid comprises the environmental-friendly high-temperature resistant water-based drilling fluid plugging anti-sloughing agent.

The present disclosure has the following technical characteristics and favorable effects:

(1) the present disclosure uses a double-crosslinking form, combines a chemical crosslinking agent and a silane coupling agent to form a double-crosslinking network structure, which limits movement of the polymer chain, prevents the plugging anti-sloughing agent from decomposition at the high temperature, improves its high-temperature resistance, such that the plugging anti-sloughing agent still produce desirable plugging and anti-sloughing effects at high temperature.

(2) The plugging anti-sloughing agent prepared by the present disclosure has a core-shell structure, wherein a polymer with a high softening point synthesized with a specific monomer is used as a core, and a polymer synthesized with a specific monomer having strong hydrophilicity and adsorption is used as a shell. The surface of the prepared plugging anti-sloughing agent contains hydrophilic groups, so that the plugging anti-sloughing agent is apt to disperse in water and can be applied in a water-based drilling fluid; in addition, the surface of the prepared plugging anti-sloughing agent contains amino group, sulfonic acid group, cationic group and the like, so as to generate the strong adsorption between the plugging agent and rocks at the well wall, increase the retention capacity among pores and cracks, thereby performing the effective plugging; the core is polystyrene/acrylic resin, has a certain softening point, has strong adaptability in regard to pores and cracks of the stratum, such that its plugging property in regard to the pores and cracks of the stratum is greatly enhanced.

(3) The plugging anti-sloughing agent prepared by the present disclosure solves the problems of high chrominance and poor environmental protection performance of the sulfonated plugging anti-sloughing agents, it is non-toxic, green and environment-friendly. The prepared plugging anti-sloughing agent comprises acrylic resin units, which will not change into a fluid state even at a higher temperature, so that the plugging anti-sloughing agent has a wide softening window; moreover, the plugging anti-sloughing agent also contains a double cross-linked network structure, a high-temperature resistant benzene ring, a sulfonic acid group and the like, such that the plugging anti-sloughing agent disclosed by the present disclosure has excellent high-temperature resistance, can resist the high temperature of 200° C., and still exhibits excellent plugging and anti-sloughing properties at the high temperature. The plugging anti-sloughing agent of the present disclosure has desirable anti-sloughing, reducing filtrate loss and plugging performances; when the plugging anti-sloughing agent is added into the drilling fluid, the plugging anti-sloughing agent can be rapidly dispersed; during the well drilling process, because there is the bottom hole pressure difference, the particles of the plugging anti-sloughing agent can enter the pores and cracks of the well wall and are adsorbed on the well wall under the action of strong adsorption groups, so as to produce the effects of plugging, anti-sloughing and reducing filtrate loss.

DETAILED DESCRIPTION

In a first aspect, the present disclosure provides a preparation method of an environment-friendly high-temperature resistant water-based drilling fluid plugging anti-sloughing agent, wherein the method comprises the following steps:

(1) mixing a styrene monomer and an acrylic monomer to obtain a mixed monomer; then blending and emulsifying the mixed monomer and an emulsifier MS-1 in an aqueous solution to prepare a pre-polymerization emulsion;

(2) dispersing hydrophilic monomer, cationic monomer and the emulsifier MS-1 in water to obtain an emulsion, and adjusting pH to be within a range of 6.5-8.5 to obtain a dispersion liquid; then adding the mixed monomers consisting of a styrene monomer and an acrylic monomer, blending and emulsifying the mixture to prepare a post-polymerization emulsion;

(3) adding a first cross-linking agent and a first initiator sequentially into the pre-polymerization emulsion obtained in the step (1), uniformly dispersing, and carrying out reaction at the temperature of 60-90° C. for 0.5-2 h; then dropwise adding the post-polymerization emulsion obtained in the step (2), adding a second cross-linking agent and a second initiator sequentially, uniformly dispersing and then continuously carrying out reaction at the temperature of 60-90° C. for 2-5 hours, drying and crushing the reaction product to prepare the environment-friendly high-temperature resistant water-based drilling fluid plugging anti-sloughing agent; the first cross-linking agent is a mixture of a chemical cross-linking agent and a silane coupling agent, the chemical cross-linking agent is N,N-methylene bisacrylamide or water-soluble phenolic resin, and the silane coupling agent is KH550, KH560 or KH570; the second cross-linking agent is the same as the first crosslinking agent.

According to the present disclosure, the silane coupling agent is one or more selected from the group consisting of KH550, KH560 and KH570. Wherein the chemical name of KH550 is γ-aminopropyltriethoxysilane (CAS: 919-30-2), the chemical name of KH560 is γ-(2,3-glycidoxy) propyltrimethoxysilane (CAS: 2530-83-8), and the chemical name of KH570 is γ-(2,3-glycidoxy) propyltrimethoxysilane (CAS: 2530-85-0).

According to the present application, it is preferable that the styrene monomer in step (1) is one or both of styrene and methyl styrene; the acrylic monomer is one of methyl methacrylate, methyl acrylate, butyl methacrylate, ethyl acrylate and stearyl acrylate or the combination thereof. Preferably, the styrene monomer is styrene, and the acrylic monomer is methyl methacrylate.

Preferably, in step (1), the mass content of the acrylic monomer in the mixed monomer is within a range of 20-30%.

According to the present disclosure, in the step (1), the mass concentration of the emulsifier MS-1 aqueous solution is within a range of 1-3%; the mass concentration of the mixed monomer in the pre-polymerization emulsion is within a range of 10-30%. Preferably, the mass concentration of the emulsifier MS-1 aqueous solution is 2%; the mass concentration of the mixed monomer in the pre-polymerization emulsion is 20%.

Wherein the emulsifier is sodium alkyl phenol ether sulfosuccinate, and the trade name is MS-1, wherein MS-1 (CAS: 58265-74-0) is purchased from Jiangsu Hai'an petrochemical plant.

According to the present disclosure, it is preferable that in the step (2), the hydrophilic monomer is two or more selected from the group consisting of acrylic acid, methacrylic acid, 2-acrylamido-2-methylpropanesulfonic Acid (AMPS) and acrylamide or a combination thereof; the cationic monomer is one or more selected from the group consisting of dimethyldiallylammonium chloride (DM- DAAC), methacryloyloxyethyltrimethylammonium chloride (DMC) and acryloyloxyethyltrimethylammonium chloride (DAC) or a combination thereof. Preferably, the hydrophilic monomer is a combination of 2-acrylamido-2-methylpropanesulfonic Acid (AMPS) and acrylamide; the cationic monomer is dimethyldiallylammonium chloride (DMDAAC).

According to the present disclosure, in the step (2), the mass concentration of the hydrophilic monomer in the emulsion is within a range of 10-30%, the mass concentration of the cationic monomer is within a range of 0.5-3%, and the mass concentration of the emulsifier MS-1 is within a range of 1-2%. Preferably, the mass concentration of the hydrophilic monomer in the emulsion is within a range of 15-25%, and the mass concentration of the cationic monomer is within a range of 0.5-1%.

Preferably, the pH in step (2) is adjusted by using 25-35 wt % aqueous sodium hydroxide solution.

Preferably, in step (2), the styrene monomer is one or both of styrene and methyl styrene; the acrylic monomer is one of methyl methacrylate, methyl acrylate, butyl methacrylate, ethyl acrylate or octadecyl acrylate or a combination thereof; in the mixed monomer, the mass content of the acrylic monomer is within a range of 20-30%. Preferably, the styrene monomer is styrene, and the acrylic monomer is methyl methacrylate or methyl acrylate.

Preferably, in step (2), the volume ratio of the dispersion liquid to the mixed monomer is 3:1 to 6:1.

According to the present disclosure, it is preferable that in step (3), the chemical crosslinking agent is N,N-methylene bisacrylamide, and the silane coupling agent is KH550.

Preferably, in step (3), the mass ratio of the chemical crosslinking agent to the silane coupling agent is 1:1 to 2:1.

Preferably, in step (3), the mass of the first crosslinking agent is 0.2-0.5% of the mass of the mixed monomers in the pre-polymerization emulsion; the mass of the second crosslinking agent is 0.2-0.5% of the total mass of the monomers in the post-polymerization emulsion.

Preferably, in step (3), the first initiator is ammonium persulfate, potassium persulfate or benzoyl peroxide, preferably ammonium persulfate; the second initiator is the same as the first initiator.

Preferably, in step (3), the mass of the first initiator is 0.1-0.3% of the mass of the mixed monomers in the pre-polymerization emulsion; the mass of the second initiator is 0.1-0.3% of the total mass of the monomers in the post-polymerization emulsion.

According to the present disclosure, in step (3), the mass ratio of the total mass of the monomers in the post-polymer emulsion to the mass of the mixed monomers in the pre-polymerization emulsion is 1:1 to 2:1; preferably, the mass ratio of the total mass of the monomers in the post-polymer emulsion to the mixed monomers in the pre-polymerization emulsion is 1.05:1.

Preferably, in step (3), the dropping rate is 4-6 mL/min.

Preferably, in step (3), the drying temperature is within a range of 100–120° C., the mixture after being crushed is screened by a 100-mesh sieve.

In the second aspect, the present disclosure provides an environment-friendly high-temperature resistant water-based drilling fluid plugging anti-sloughing agent obtained with the aforementioned preparation method.

According to the present disclosure, the plugging anti-sloughing agent has a core-shell structure, a polymer with a high softening point synthesized with a specific monomer is used as a core, and a polymer synthesized with a specific monomer having strong hydrophilicity and strong adsorption is used as a shell.

According to the present disclosure, the core is a polystyrene/acrylic polymer.

According to the present disclosure, the surface of the plugging anti-sloughing agent contains hydrophilic groups.

According to the present disclosure, the surface of the plugging anti-sloughing agent contains amine groups, sulfonic acid groups or cationic groups.

In a third aspect, the present disclosure provides a water-based drilling fluid, wherein the water-based drilling fluid comprises the aforementioned environment-friendly high-temperature resistant water-based drilling fluid plugging anti-sloughing agent.

According to the present disclosure, the water-based drilling fluid comprises bentonite, a plugging anti-sloughing agent, a viscosity reducer, a filtrate loss reducer, an inhibitor, a lubricant and barite; the dosage of the bentonite is 15-20 g, the dosage of the plugging anti-sloughing agent is 7-10 g, the dosage of the viscosity reducer is 0.4-1.2 g, the dosage of the filtrate loss reducer is 4-6 g, the dosage of the inhibitor is 3-5 g, the dosage of the lubricant is 8-10 g, based on 400 mL of water.

According to the present disclosure, the plugging anti-sloughing agent is the environment-friendly high-temperature resistant water-based drilling fluid plugging anti-sloughing agent previously mentioned in the present disclosure.

According to the present disclosure, the viscosity reducer is maleic anhydride copolymer SMA (purchased from Shenzhen PST New Material technology Co., Ltd.); the filtrate loss reducer is vinyl sulfonate copolymer DSP-1 (purchased from Shandong Deshunyuan Petroleum Technology Co., Ltd.); the inhibitor is polyamine AP-1 (purchased from Shandong Deshunyuan Petroleum Technology Co., Ltd.); the lubricant is methyl oleate (with a purity of 99%, purchased from Nantong Runfeng Petrochemical Co., Ltd.); moreover, the barite in the present disclosure is used for increasing weigh to 1.5 g/cm$^3$.

The present disclosure is further described by means of the specific examples as follows, but it is not limited thereto.

The raw materials used in the examples are commercially available.

Example 1

A preparation method of an environment-friendly high-temperature resistant water-based drilling fluid plugging anti-sloughing agent, the preparation method comprises the following steps:

a) Preparation of the pre-polymerization emulsion:

(1) 32 g styrene and 8 g methyl methacrylate were mixed to obtain a mixed monomer;

(2) 3.2 g emulsifier MS-1 was dissolved in 160 mL of deionized water to prepare an emulsifier MS-1 aqueous solution having a concentration of 2 wt %, the mixed monomer obtained in the step (1) was added into the aqueous solution, the aqueous solution was emulsified with a shearing emulsifying machine to form a stable pre-polymerization emulsion.

b) Preparation of the post-polymerized emulsion:

(3) 20 g AM (acrylamide), 5 g AMPS (2-acrylamido-2-methylpropanesulfonic acid), 1 g DMDAAC (dimethyldiallylammonium chloride) and 2 g emulsifier MS-1 were fully dissolved in 100 ml of water to obtain an emulsion, and the pH value was adjusting to 7 by using 30 wt % of sodium hydroxide aqueous solution, so as to obtain a dispersion liquid;

(4) 12 g styrene and 3 g methyl methacrylate was mixed to obtain a mixed hydrophobic monomer;

(5) The mixed hydrophobic monomer obtained in the step (4) was added into the dispersion liquid obtained in the step (3), the dispersion liquid was emulsified with a shearing emulsifying machine to form a post-polymerization emulsion.

c. Stepwise Polymerization (6) The pre-polymerization emulsion prepared in the step a) was taken, and sequentially added and dissolved with 0.08 g N,N-methylene bisacrylamide, 0.08 g KH550 and 0.1 g oxidative initiator ammonium persulfate, subjected to reaction at 80° C. for 1 h to form a core;

(7) The post-polymerization emulsion prepared in the step b) was slowly and dropwise added (5 mL/min), and sequentially added and dissolved with 0.08 g N,N-methylene bisacrylamide, 0.08 g KH550 and 0.1 g oxidative initiator ammonium persulfate, and subjected to continuous reaction at the temperature of 80° C. for 4 hours to obtain a white emulsion liquid. The white emulsion liquid was dried at the temperature of 105° C., the dried product was then crushed and screened with a 100-mesh sieve, thereby prepare the plugging anti-sloughing agent.

Example 2

A preparation method of an environment-friendly high-temperature resistant water-based drilling fluid plugging anti-sloughing agent, the preparation method comprises the following steps:

a) Preparation of the pre-polymerization emulsion:

(1) 28 g styrene and 12 g methyl methacrylate were mixed to obtain a mixed monomer;

(2) 3.2 g emulsifier MS-1 was dissolved in 160 mL of deionized water to prepare an emulsifier MS-1 aqueous solution having a concentration of 2 wt %, the mixed monomer obtained in the step (1) was added into the aqueous solution, the aqueous solution was emulsified with a shearing emulsifying machine to form a stable pre-polymerization emulsion.

b) Preparation of the post-polymerized emulsion:

(3) 25 g AM (acrylamide), 1 g AMPS (2-acrylamido-2-methylpropanesulfonic acid), 1 g DMDAAC (dimethyldiallylammonium chloride) and 2 g emulsifier MS-1 were fully dissolved in 100 ml of water to obtain an emulsion, and the pH value was adjusting to 7 by using 30 wt % of sodium hydroxide aqueous solution, so as to obtain a dispersion liquid;

(4) 10.5 g styrene and 4.5 g methyl methacrylate was mixed to obtain a mixed hydrophobic monomer;

(5) The mixed hydrophobic monomer obtained in the step (4) was added into the dispersion liquid obtained in the step (3), the dispersion liquid was emulsified with a shearing emulsifying machine to form a post-polymerization emulsion.

c. Stepwise polymerization (6) The pre-polymerization emulsion prepared in the step a) was taken, and sequentially added and dissolved with 0.07 g N,N-methylene bisacrylamide, 0.06 g KH550 and 0.1 g oxidative initiator ammonium persulfate, subjected to reaction at 80° C. for 1 h to form a core;

(7) The post-polymerization emulsion prepared in the step b) was slowly and dropwise added (5 mL/min), and sequentially added and dissolved with 0.07 g N,N-methylene bisacrylamide, 0.06 g KH550 and 0.1 g oxidative initiator ammonium persulfate, and subjected to continuous reaction at the temperature of 80° C. for 4 hours to obtain a white emulsion liquid. The white emulsion liquid was dried at the temperature of 105° C., the dried product was then crushed and screened with a 100-mesh sieve, thereby prepare the plugging anti-sloughing agent.

Example 3

A preparation method of an environment-friendly high-temperature resistant water-based drilling fluid plugging anti-sloughing agent, the preparation method comprises the following steps:

a) Preparation of the pre-polymerization emulsion:

(1) 32 g styrene and 8 g methyl methacrylate were mixed to obtain a mixed monomer;

(2) 3.2 g emulsifier MS-1 was dissolved in 160 mL of deionized water to prepare an emulsifier MS-1 aqueous solution having a concentration of 2 wt %, the mixed monomer obtained in the step (1) was added into the aqueous solution, the aqueous solution was emulsified with a shearing emulsifying machine to form a stable pre-polymerization emulsion.

b) Preparation of the post-polymerized emulsion:

(3) 15 g AM (acrylamide), 10 g AMPS (2-acrylamido-2-methylpropanesulfonic acid), 2 g DMDAAC (dimethyldiallylammonium chloride) and 2 g emulsifier MS-1 were fully dissolved in 100 ml of water to obtain an emulsion, and the pH value was adjusting to 7 by using 30 wt % of sodium hydroxide aqueous solution, so as to obtain a dispersion liquid;

(4) 10.5 g styrene and 4.5 g methyl methacrylate was mixed to obtain a mixed hydrophobic monomer;

(5) The mixed hydrophobic monomer obtained in the step (4) was added into the dispersion liquid obtained in the step (3), the dispersion liquid was emulsified with a shearing emulsifying machine to form a post-polymerization emulsion.

c. Stepwise polymerization (6) The pre-polymerization emulsion prepared in the step a) was taken, and sequentially added and dissolved with 0.07 g N,N-methylene bisacrylamide, 0.05 g KH550 and 0.1 g oxidative initiator ammonium persulfate, subjected to reaction at 80° C. for 1 h to form a core;

(7) The post-polymerization emulsion prepared in the step b) was slowly and dropwise added (5 mL/min), and sequentially added and dissolved with 0.07 g N,N-methylene bisacrylamide, 0.05 g KH550 and 0.1 g oxidative initiator ammonium persulfate, and subjected to continuous reaction at the temperature of 80° C. for 4 hours to obtain a white emulsion liquid. The white emulsion liquid was dried at the temperature of 105° C., the dried product was then crushed and screened with a 100-mesh sieve, thereby prepare the plugging anti-sloughing agent.

Comparative Example 1

The Comparative Example serves to illustrate a preparation method of a plugging anti-sloughing agent, the preparation method comprises the following steps:

(1) 32 g styrene and 8 g methyl methacrylate were mixed to obtain a mixed monomer;

(2) 3.2 g emulsifier MS-1 was dissolved in 160 mL of deionized water to prepare an emulsifier MS-1 aqueous solution having a concentration of 2 wt %, 10 g acrylic acid was further added, the mixed monomer obtained in the step (1) was added into the aqueous solution, the aqueous solution was emulsified with a shearing emulsifying machine to form a stable emulsion.

The emulsion was sequentially added and dissolved with 0.1 g N,N-methylene bisacrylamide, 0.05 g KH550 and 0.1 g oxidative initiator ammonium persulfate, and subjected to reaction at the temperature of 80° C. for 4 hours to obtain a white emulsion liquid. The white emulsion liquid was dried at the temperature of 105° C., the dried product was then crushed and screened with a 100-mesh sieve, thereby prepare the plugging anti-sloughing agent.

Comparative Example 2

The Comparative Example serves to illustrate a preparation method of a plugging anti-sloughing agent, the preparation method comprises the following steps:

The plugging anti-sloughing agent was prepared according to the same method as the Example 1, except that:

The N,N-methylene bisacrylamide and the KH550 were not added in the step (6); and the N,N-methylene bisacrylamide and the KH550 were not added in the step (7); the other steps and conditions were identical to those of the Example 1.

Comparative Example 3

The commercially available sulfonated asphalt FT-1 was used as a plugging anti-sloughing agent.

It should be noted in the present disclosure that the commercially available sulfonated asphalt FT-1 was provided by Jinan Juxin chemical Co., Ltd, the sodium sulfonate content was not less than 10%, the material was in compliance with the technical requirements of the Enterprise Standard QSH 0043-2007 of the China Petrochemical Corporation (Sinopec Group) in regard to the sulfonated asphalt for the drilling fluid.

Test Example 1

The sand bed plugging performance test was performed in regard to the plugging anti-sloughing agents prepared in the Examples 1-3 and the Comparative Examples 1-2, and the commercially available sulfonated asphalt FT-1 sample used as the plugging anti-sloughing agent in the Comparative Example 3, the specific method was as follows:

The samples were respectively added into 4 wt % of base slurry (prepared by adding 16 g of bentonite into 400 ml of distilled water and stirring at room temperature for 24 hours) to prepare drilling fluids with the sample concentration of 2 wt %; the invasion depths of the drilling fluid in regard to the 40-60 mesh sand bed and the 60-80 mesh sand bed were respectively measured by using the visual sand bed plugging instrument under the test conditions of room temperature and the pressure of 0.7 MPa.

The test results were shown in Table 1 below, which illustrated a data sheet of invasion depths of the sand beds.

TABLE 1

| Samples | 40-60 mesh sand bed | 60-80 mesh sand bed |
| --- | --- | --- |
| 4% base slurry | leaked completely | leaked completely |
| Example 1 | 8.2 cm | 6.5 cm |
| Example 2 | 8.6 cm | 6.2 cm |
| Example 3 | 8.6 cm | 6.4 cm |
| Comparative Example 1 | 15.2 cm | 12.4 cm |
| Comparative Example 2 | 8.8 cm | 7.5 cm |
| Comparative Example 3 | 9.4 cm | 6.8 cm |

As can be seen from Table 1:

(1) The plugging anti-sloughing agents prepared in the Examples 1-3 with the method of the present application have better plugging capability than the commercially available sulfonated asphalt FT-1, and exhibit desirable plugging effects in regard to both the 40-60 meshes and 60-80 meshes of sand beds, it further demonstrates that the plugging anti-sloughing agents of the present disclosure have strong adaptability and are applicable to the pores and cracks with different sizes.

(2) Because there is not strong adsorption group in the Comparative Example 1, the prepared plugging anti-sloughing agent can't reside in the sand bed effectively, and may be easily washed away by the high-pressure fluid, its plugging effect is weaker than those of the Examples 1-3.

(3) Given that the crosslinking agent is not added in the Comparative Example 2, the prepared plugging anti-sloughing agent shows desirable effect in the sand bed plugging test at room temperature, but the effect is slightly inferior to those of the Examples 1-3 of the present disclosure.

Test Example 2

The measurements of API filtrate loss and High Temperature and High Pressure (HTHP) filtrate loss were performed on the plugging anti-sloughing agents prepared in the Examples 1-3 and the Comparative Examples 1-2, and the commercially available sulfonated asphalt FT-1 sample used as the plugging anti-sloughing agent in the Comparative Example 3, the specific method was as follows:

The samples were respectively added into 4 wt % of base slurry (prepared by adding 16 g of bentonite into 400 ml of distilled water and stirring at room temperature for 24 hours) to prepare drilling fluids with the sample concentration of 2 wt %; the API filtrate loss of the drilling fluid was tested by referring to the national standard GB/T29170-2012 of China with respect to laboratory test for industry drilling fluids in the oil and natural gas; the prepared drilling fluids were aged at the temperature of 200° C. for 16 hours by using a roller heating furnace, the high-temperature high-pressure filtrate loss was subsequently measured at the temperature of 180° C.

The test results were as shown in Table 2 below, which illustrated the test data of the API filtrate loss and High Temperature and High Pressure (HTHP) filtrate loss.

TABLE 2

| Drilling fluid | API filtrate loss | HTHP filtrate loss (180° C.) |
| --- | --- | --- |
| 4% base slurry | 26.8 ml | 126 ml |
| Example 1 | 7.6 ml | 28 mL |
| Example 2 | 7.4 ml | 36 mL |
| Example 3 | 7.8 ml | 32 ml |
| Comparative Example 1 | 16.2 ml | 84 ml |
| Comparative Example 2 | 8.2 ml | 76 ml |
| Comparative Example 3 | 8.4 ml | 40 ml |

As can be seen from Table 2:

(1) The plugging anti-sloughing agents prepared in the Examples 1-3 with the method of the present application have better filtrate loss reduction and plugging performance, the temperature resistance can reach 200° C., and the plugging anti-sloughing agents still exhibit desirable filtrate loss reduction and plugging performance at high temperature, because the benzene ring structure, the sulfonic acid group, the double cross-linked network structure and the like are beneficial to improving the temperature resistance of the polymer.

(2) Both the API filtrate loss and the high temperature and high pressure filtrate loss of the plugging anti-sloughing agent in the Comparative Example 1 were high, it shows that the filtrate loss reduction effect was poor, which was resulting from the lack of the strong adsorption group.

(3) Although the plugging anti-sloughing agent in the Comparative Example 2 has low API filtrate loss, it has poor temperature resistance, which shows that the high temperature and high pressure filtrate loss is high, the reasons are that the molecular chain is easily decomposed at high temperature due to the lack of the crosslinking agent, thus the plugging effect cannot be performed.

Test Example 3

The water-based drilling fluid system formed by the plugging anti-sloughing agent prepared in the Example 1 was subjected to rheological filtrate loss performance test by referring to the National Standard GB/T29170-2012 of China with respect to laboratory test for industry drilling fluids in the oil and natural gas, the drilling fluid system was aged at the temperature of 200° C. for 16 h to measure the performance change of the drilling fluid system.

Wherein the formula of the drilling fluid system was as follows: 400 mL of water, 16 g of bentonite, 8 g of the plugging anti-sloughing agent prepared in Example 1, 0.8 g of the high-temperature resistant viscosity reducer SMA, 4 g of the vinyl sulfonate copolymer DSP-1, 3 g of polyamine AP-1, 12 g of KCl and 8-10 g of methyl oleate, the weight was increased to 1.5 g/cm$^3$ by using the barite.

The test results were shown in Table 3 below, which illustrated the drilling fluid rheological filtrate loss parameter and the High Temperature and High Pressure (HTHP) filtrate loss test data.

TABLE 3

| Density g/cm$^3$ | Treatment Condition | AV mPa·s | PV mPa·s | YP Pa | Ratio of dynamic shear force to plastic viscosity | G'/G" Pa | API filtrate loss mL | High Temperature and High Pressure filtrate loss (180° C.) mL |
|---|---|---|---|---|---|---|---|---|
| 1.50 | Before aging | 61 | 45 | 16 | 0.36 | 5.5/9.0 | 6.8 | — |
|  | After aging | 49.5 | 35 | 14.5 | 0.39 | 1.5/4.0 | 12.4 | 24.6 |

Test Example 4

The sand bed plugging performance test was performed in regard to the water-based drilling fluid system formed with the plugging anti-sloughing agent prepared in the Example 1.

Wherein the formula of the drilling fluid system was as follows: 400 mL of water, 16 g of bentonite, 8 g of the plugging anti-sloughing agent prepared in the Example 1, 0.8 g of the high-temperature resistant viscosity reducer SMA, 4 g of the vinyl sulfonate copolymer DSP-1, 3 g of polyamine AP-1, 12 g of KCl and 8-10 g of methyl oleate, the weight was increased to 1.5 g/cm' by using the barite.

The test method was as follows: the invasion depths of the drilling fluid system in regard to the 40-60 mesh sand bed and the 60-80 mesh sand bed were respectively measured before aging and after aging by using the visual sand bed plugging instrument under the test conditions of room temperature and the pressure of 0.7 MPa.

The test results were shown in Table 4 below, which illustrated the invasion depths of the drilling fluid system before and after high temperature aging (at the temperature 200° C. for 16 h) in regard to the sand beds with different mesh sizes.

TABLE 4

| Meshes of the sand bed | | 40-60 mesh sand bed | 60-80 mesh sand bed |
|---|---|---|---|
| Invasion depths | Before aging | 3.2 cm | 2.4 cm |
| | After aging | 3.6 cm | 3.2 cm |

To sum up, the drilling fluid system has desirable rheological, filtrate loss reduction and plugging properties, the rheological parameters have small change before and after the high-temperature aging process, the filtrate loss and the high-temperature and high-pressure filtrate loss are kept at lower levels, its invasion depths in regard to 40-60 mesh and 60-80 mesh sand beds are lower, thus the drilling fluid system has excellent plugging property and temperature resistance.

The invention claimed is:

1. A preparation method of an environment-friendly high-temperature resistant water-based drilling fluid plugging anti-sloughing agent, comprising:

(1) mixing a styrene monomer and an acrylic monomer to obtain a mixed monomer; then blending and emulsifying the mixed monomer and an emulsifier in an aqueous solution to prepare a pre-polymerization emulsion; the mass content of the acrylic monomer in the mixed monomer is 20-30%; the mass concentration of the emulsifier aqueous solution is 1-3%; the mass concentration of the mixed monomer in the pre-polymerization emulsion is 10-30%;

(2) dispersing hydrophilic monomer, cationic monomer and the emulsifier in water to obtain an emulsion, and adjusting pH to be within a range of 6.5-8.5 to obtain a dispersion liquid; then adding the mixed monomers, blending and emulsifying the mixture to prepare a post-polymerization emulsion; the mass concentration of the hydrophilic monomer in the emulsion is 10-30%, the mass concentration of the cationic monomer is 0.5-3%, and the mass concentration of the emulsifier is 1-2%; the mass concentration of the mixed monomer in the post-polymerization emulsion is 20-35%; the volume ratio of the dispersion liquid to the mixed monomer is 3:1 to 6:1;

(3) adding a first cross-linking agent and a first initiator sequentially into the pre-polymerization emulsion obtained in the step (1), uniformly dispersing, and carrying out reaction at the temperature of 60-90° C. for 0.5-2 h; then dropwise adding the post-polymerization emulsion obtained in the step (2), adding a second cross-linking agent and a second initiator sequentially, uniformly dispersing and then continuously carrying out reaction at the temperature of 60-90° C. for 2-5 hours, drying and crushing the reaction product to prepare an environment-friendly high-temperature resistant water-based drilling fluid plugging anti-sloughing agent; the mass ratio of the chemical cross-linking agent to the silane coupling agent in the first crosslinking agent and the second crosslinking agent is 1:1 to 2:1; the mass of the first crosslinking agent is 0.2-0.5% of the mass of the mixed monomers in the pre-polymerization emulsion; the mass of the second cross-linking agent is 0.2-0.5% of the total mass of the monomers in the post-polymerization emulsion;

wherein the first cross-linking agent is a mixture of a chemical cross-linking agent and a silane coupling agent; the chemical cross-linking agent is N, N-methylene bisacrylamide or water-soluble phenolic resin; the silane coupling agent is one or more selected from the group consisting of γ-aminopropyltriethoxysilane, γ-(2,3-glycidoxy) propyltrimethoxysilane and γ-(2,3-glycidoxy) propyltrimethoxysilane; the second cross-linking agent is the same as the first crosslinking agent;

wherein the first initiator is one or more selected from the group consisting of ammonium persulfate, potassium persulfate and benzoyl peroxide; the second initiator is the same as the first initiator;

wherein the plugging anti-sloughing agent has a core-shell structure, a polymer with a high softening point synthesized with a specific monomer is used as a core, and a polymer synthesized with a specific monomer having strong hydrophilicity and strong adsorption is used as a shell.

2. The preparation method of claim 1, wherein the step (1) comprises the following condition:
the styrene monomer is styrene and/or methyl styrene; the acrylic monomer is one or more selected from the group consisting of methyl methacrylate, methyl acrylate, butyl methacrylate, ethyl acrylate and stearyl acrylate.

3. The preparation method of claim 2, wherein the styrenic monomer is styrene, and the acrylic monomer is methyl methacrylate.

4. The preparation method of claim 1, wherein in the step (2), the hydrophilic monomer is two or more selected from the group consisting of acrylic acid, methacrylic acid, 2-acrylamido-2-methylpropanesulfonic Acid (AMPS) and acrylamide or a combination thereof; the cationic monomer is one or more selected from the group consisting of dimethyldiallylammonium chloride (DMDAAC), methacryloyloxyethyltrimethylammonium chloride (DMC) and acryloyloxyethyltrimethylammonium chloride (DAC) or a combination thereof.

5. The preparation method of claim 4, wherein the hydrophilic monomer is a combination of 2-acrylamido-2-methylpropanesulfonic Acid (AMPS) and acrylamide; the cationic monomer is dimethyldiallylammonium chloride (DMDAAC).

6. The preparation method of claim 1, wherein the mass concentration of the hydrophilic monomer in the emulsion is 15-25%, and the mass concentration of the cationic monomer is 0.5-1%.

7. The preparation method of claim 1, wherein the pH in step (2) is adjusted by using 25-35 wt % aqueous sodium hydroxide solution.

8. The preparation method of claim 1, wherein in the step (3):
(a) the first cross-linking agent is a mixture of a chemical cross-linking agent and a silane coupling agent; the chemical cross-linking agent is N, N-methylene bisacrylamide or water-soluble phenolic resin; the silane coupling agent is one or more selected from the group consisting of γ-aminopropyltriethoxysilane, γ-(2,3-glycidoxy) propyltrimethoxysilane and γ-(2,3-glycidoxy) propyltrimethoxysilane; the second crosslinking agent is the same as the first crosslinking agent;
wherein the first initiator is one or more selected from the group consisting of ammonium persulfate, potassium persulfate and benzoyl peroxide; the second initiator is the same as the first initiator;
(b) the mass of the first initiator is 0.1-0.3% of the mass of the mixed monomers in the pre-polymerization emulsion; the mass of the second initiator is 0.1-0.3% of the total mass of the monomers in the post-polymerization emulsion;
(c) the mass ratio of the total mass of the monomers in the post-polymerization emulsion to the mixed monomers in the pre-polymerization emulsion is 1:1 to 2:1;
(d) the dropping speed is 4-6 mL/min;
(e) the drying temperature is 100-120° C., the mixture after being crushed is screened by a 100-mesh sieve.

9. The environment-friendly high-temperature resistant water-based drilling fluid plugging anti-sloughing agent obtained by the preparation method of claim 1.

10. The plugging anti-sloughing agent of claim 9, wherein the plugging anti-sloughing agent has a core-shell structure, a polymer with a high softening point synthesized with a specific monomer is used as a core, and a polymer synthesized with a specific monomer having strong hydrophilicity and strong adsorption is used as a shell.

11. The plugging anti-sloughing agent of claim 9, wherein the core is a polystyrene/acrylic polymer.

12. The plugging anti-sloughing agent of claim 9, wherein the surface of the plugging anti-sloughing agent contains hydrophilic groups.

13. The plugging anti-sloughing agent of claim 9, wherein the surface of the plugging anti-sloughing agent contains amine groups, sulfonic acid groups or cationic groups.

14. A water-based drilling fluid, wherein the water-based drilling fluid comprises the aforementioned environment-friendly high-temperature resistant water-based drilling fluid plugging anti-sloughing agent of claim 9.

15. The water-based drilling fluid of claim 14, wherein the water-based drilling fluid comprises bentonite, a viscosity reducer, a filtrate loss reducer, an inhibitor, a lubricant and barite; the dosage of the bentonite is 15-20 g, the dosage of the plugging anti-sloughing agent is 7-10 g, the dosage of the viscosity reducer is 0.4-1.2 g, the dosage of the filtrate loss reducer is 4-6 g, the dosage of the inhibitor is 3-5 g; the dosage of the lubricant is 8-10 g, based on 400 mL of water.

16. The water-based drilling fluid of claim 15, wherein the viscosity reducer is maleic anhydride copolymer, the filtrate loss reducer is vinyl sulfonate copolymer, the inhibitor is polyamine, and the lubricant is methyl oleate.

* * * * *